Jan. 24, 1961 S. H. CREED 2,969,098
FRUIT PREPARATION MACHINE
Filed Aug. 1, 1956 4 Sheets-Sheet 4
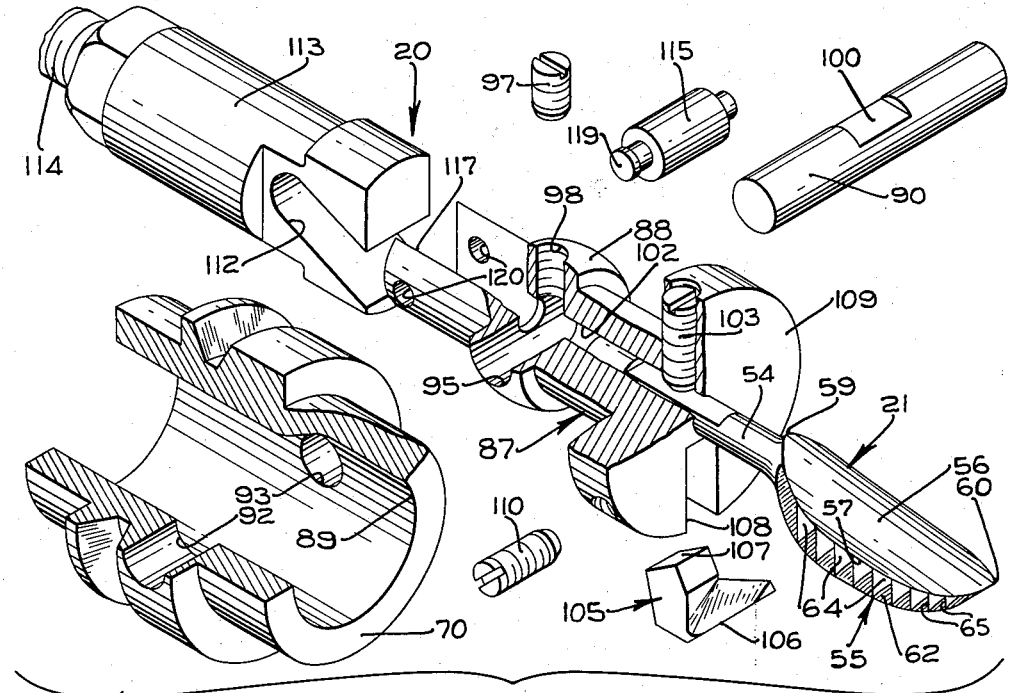
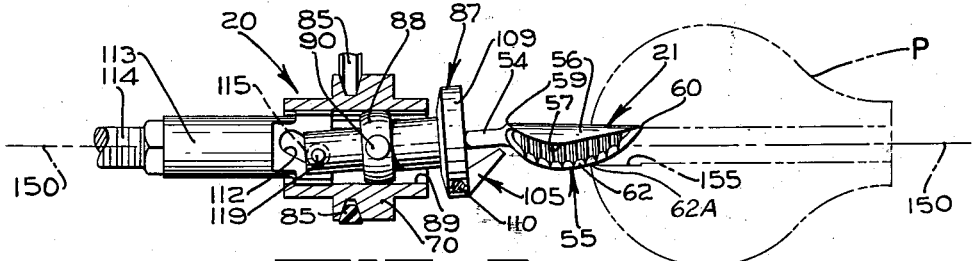
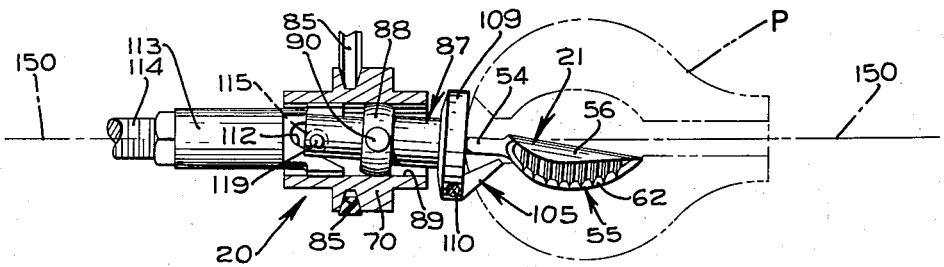
INVENTOR
SHERMAN H. CREED
BY Hans G. Hoffmeister
ATTORNEY

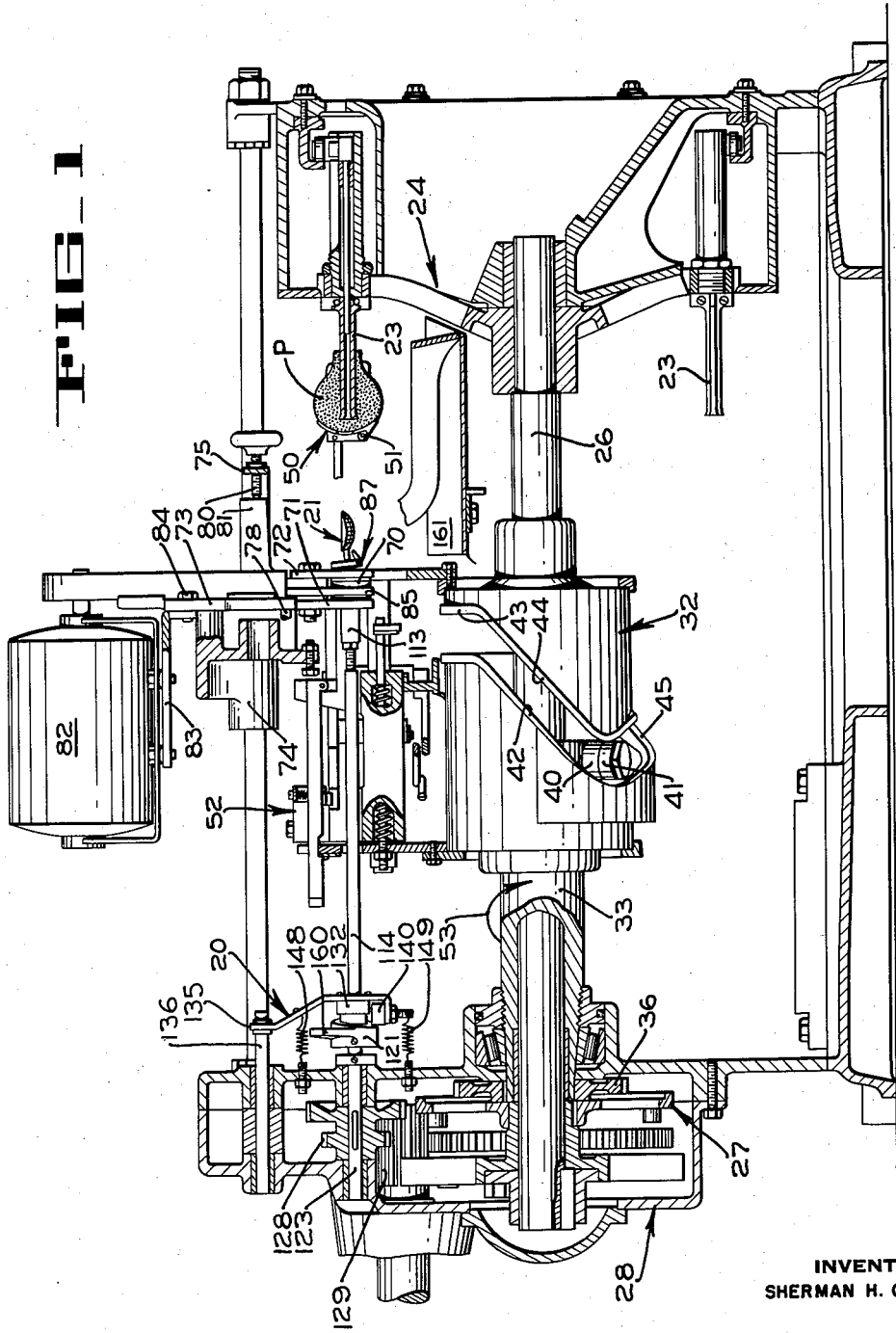

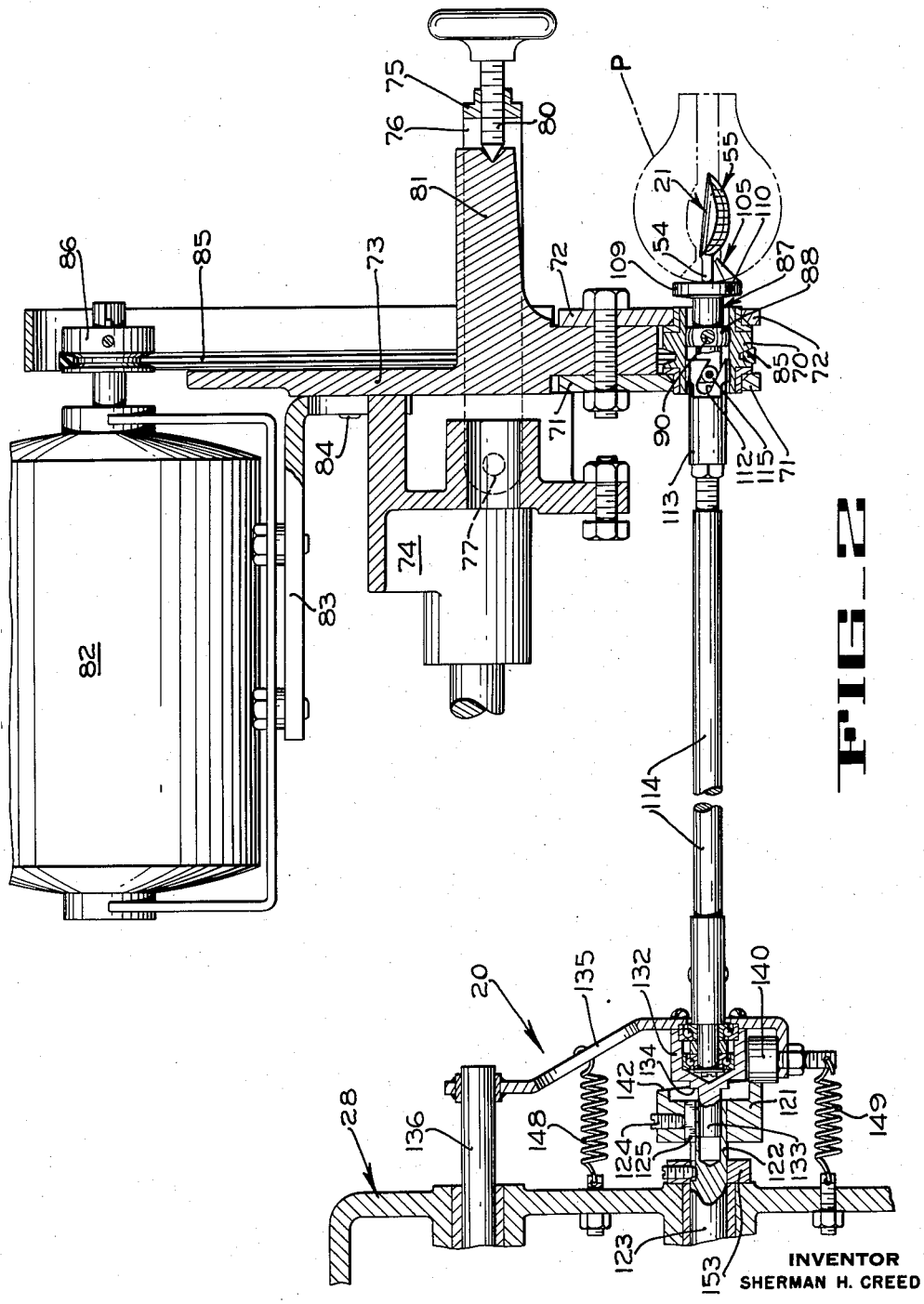

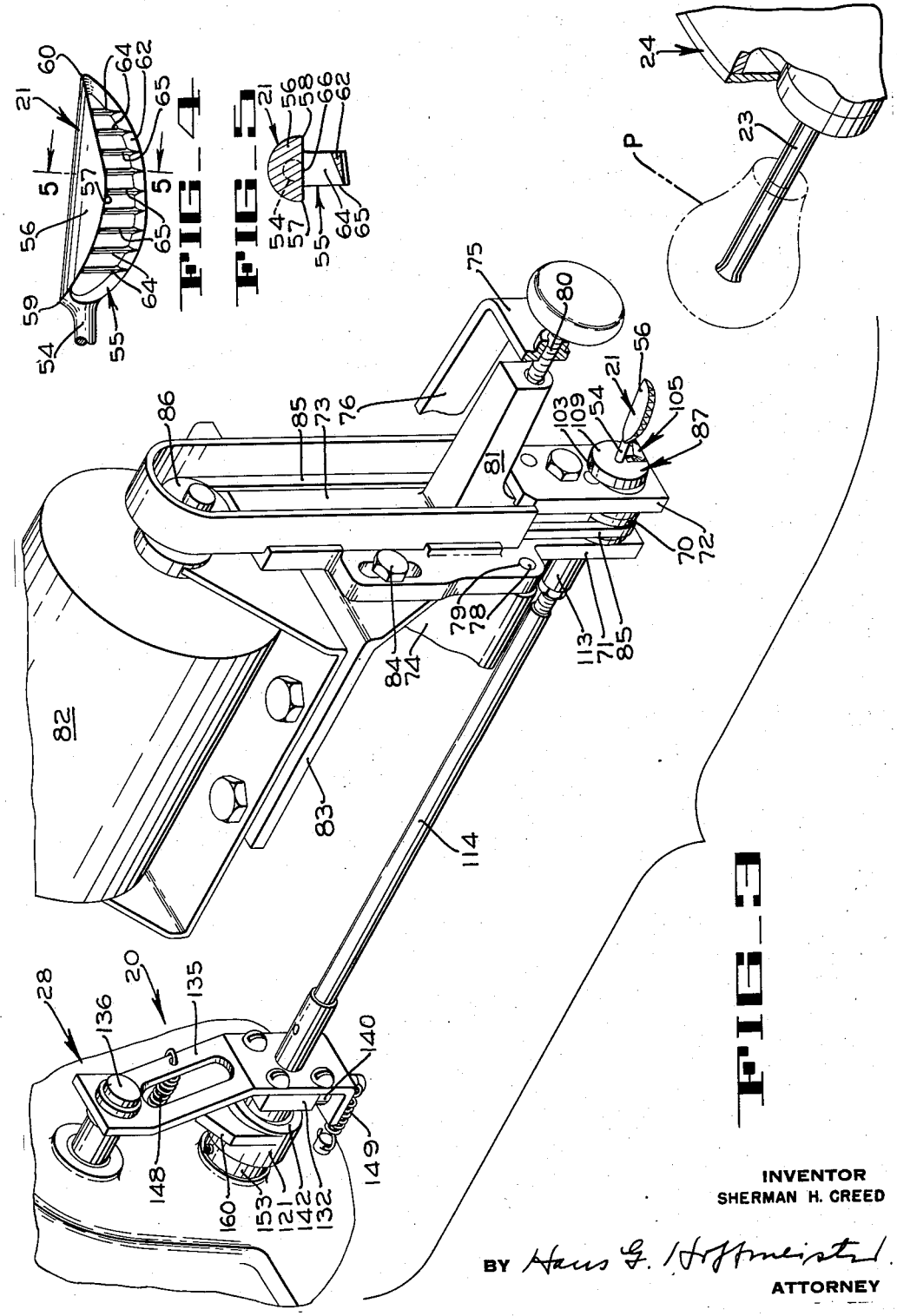

United States Patent Office 2,969,098
Patented Jan. 24, 1961

2,969,098
FRUIT PREPARATION MACHINE

Sherman H. Creed, Campbell, Calif., assignor to Food Machinery and Chemical Corporation, San Jose, Calif., a corporation of Delaware Filed Aug. 1, 1956, Ser. No. 601,541
4 Claims. (Cl. 146—52)

This invention appertains to fruit preparation apparatus, and more particularly relates to an improved device for coring a fruit, such as a pear, while the fruit is in a substantially whole condition.

In processing pears and similar fruit for use in fruit cocktail, each fruit is cut into cubes in a dicing machine. It has been found that, if each fruit is cubed after it is cut into halves, a considerable portion of the fruit is lost due to the fact that an excessive amount of unusable splinters and fragmentary cubes are produced.

It is, therefore, an object of the present invention to provide a device capable of coring a fruit while it is in a substantially whole condition.

Another object is to provide an improved knife for coring pears or the like.

Another object is to provide an improved actuating and control mechanism for a coring knife.

Other and further objects will become apparent from the following description taken in connection with the accompanying drawings in which:

Figure 1 is a vertical section taken longitudinally through a fruit preparation machine which includes a coring device incorporating the principles of the present invention.

Figure 2 is an enlarged, fragmentary vertical section through a portion of the machine of Fig. 1.

Figure 3 is an enlarged fragmentary perspective of a portion of the machine of Fig. 1.

Figure 4 is an enlarged side elevation of a portion of the coring knife of the present invention.

Figure 5 is a vertical section taken on line 5—5 of Fig. 4.

Figure 6 is an enlarged exploded view, partly in section, of the coring knife and its actuating mechanism.

Figures 7 and 8 are operational views showing consecutive steps in the coring of a whole pear.

The coring mechanism of the present invention constitutes an improvement over the coring mechanism of the fruit preparation machine disclosed in Patent No. 2,139,704 issued December 13, 1938 to Thompson and de Back, to which reference may be had for a complete description of the machine with which the present coring mechanism is associated, and for an understanding of the various stemming, coring, peeling, trimming and splitting operations in the process of preparing the fruit for canning. In Fig. 1 of the drawings the improved coring mechanism 20 of the present invention is illustrated in connection with a fruit preparation machine of the type shown in Patent No. 2,139,704. The coring mechanism 20 is provided with a knife 21 arranged to receive pears individually from stemming tubes 23 carried by an intermittently rotated turret 24. The turret 24, which has six equally spaced stemming tubes 23, is arranged to be indexed in one sixth of a revolution increments by means of a shaft 26 that is driven from a main drive shaft (not shown) through a Geneva drive 27 disposed in a gear case 28. Thus, during one revolution of the turret, each stemming tube is temporarily positioned at six processing stations.

The knife 21 of the coring mechanism 20 is disposed in alignment with a stemming tube 23 when the tube is at a processing station which will be called the pear transfer station. When the stemming tube arrives at the pear transfer station, the pear P impaled on the tube has been completely peeled and the stem end has been trimmed as shown in Fig. 1.

During the intervals between indexing movements of the turret 24, a non-rotating cam cylinder 32, which is slidably mounted on the shaft 26 and on a sleeve 33 that is positioned around the shaft 26, is reciprocated longitudinally of the shaft 26 to cause various mechanisms to operate on the pears that are disposed on the temporarily stationary stemming tubes. Near one end, the sleeve 33 carries a gear 36 which is connected to the main drive shaft of the machine by mechanism (not shown) so that the sleeve 33 is continuously rotated at the rate of one full turn for each angular indexing movement of the turret. A post 40 is rigid with and extends radially from the sleeve 33 and carries a roller 41 which is disposed in a continuous cam slot 42 in the cam cylinder 32. The continuous cam slot 42 includes a portion 43 extending part way around the cam cylinder 32 in a plane normal to the axis of the sleeve 33, and two reversely related angular, or sloping portions 44 and 45, respectively. The disposition of the camming portion 43 is such that the rotating post 40 and the roller 41 hold the cam cylinder 32 in a retracted position for a predetermined interval while an indexing movement of the turret is made.

A fruit transfer mechanism 50 (Fig. 1) is arranged to grip the pear and move it off the tube in a direction longitudinally of the tube and carry it into engagement with the continuously rotating knife 21. The details of the fruit transfer mechanism 50 and the manner in which it is operated is completely described in the co-pending application of Puccinelli et al., Serial No. 377,616 filed August 31, 1953, which became Patent No. 2,883,070 on April 21, 1959. In general, the transfer mechanism comprises a pair of fruit engaging clamp members 51 (only one being illustrated) which are secured to the cam cylinder 32 by a control linkage 52. In Fig. 1, the cam cylinder 32 is shown in its forward position wherein the fruit clamp members 51 are in engagement with the pear. As the post 40 continues to rotate with the sleeve 33 in the direction of arrow 53, the roller 41 enters the cam groove 45 and causes the cam cylinder 32 to move rearwardly, or to the left in Fig. 1, bringing the pear into engagement with the coring knife 21 and bringing the post 40 into the transverse portion 43 of the camming groove. The cam cylinder 32 remains in the rear or retracted position for a short time during which the coring of the pear is completed and the turret is indexed. During the coring operation the transfer mechanism 50 holds the pear in fixed position and, when the pear is cored, the transfer mechanism releases the pear and moves forwardly once more to grip the next pear that has been indexed to the pear transfer station.

The coring knife 21 (Figs. 4 and 5) has a generally cylindrical shank 54 and a body portion 55. The body 55 comprises a longitudinally extending guide member 56 that has a generally semi-cylindrical cross section with longitudinally curved marginal side edges 57 and 58 that converge at the rear end 59 of the guide surface and at the forward end 60. A wedge shaped blade 62 (Fig. 5) is disposed in spaced relation to the guide member 56. As seen in Fig. 4, the blade 62 is also curved longitudinally and is integrally connected with the guide member 56 at the rear end 59 and at the forward end 60 of the guide surface. A plurality of spaced blades 64 are disposed in transverse position between the guide member 56 and the blade 62. The blades 64 have cutting edges 65 (Fig. 5) that face in the same direction as the cutting edge of the wedge shaped blade 62. In operation, the knife 21 is rotated clockwise, as seen in Fig. 5. The wedge-shaped blade 62 cuts a ribbon of material as it rotates within the pear, and this ribbon is cut into a plurality of strips by the transverse blades 64. Cutting the core material into strips and fragments makes it possible to wash the core material away from the cubes of pear during a separating operation that is performed after the pear has been put through a dicing machine.

The generally cylindrical outer surface of the guide member 56 guides the pear as the pear is moved onto the knife (Fig. 7) and the ledge 66 (Fig. 5), provided by the flattened side of the guide member 56, maintains the ribbon of core material in position for cutting by the transverse blades 64 after it is cut by the wedge-shaped blade 62.

The knife 21 is rotated by means of a pulley 70 (Fig. 2) that is rotatably mounted between plates 71 and 72 at the lower end of a bracket 73. The bracket 73 is mounted on a stationary transverse support bridge 74 by a yoke 75 that has two legs 76 (one only being shown), each of which is mounted on the bridge 74 for pivoting movement on a pin 77. The bracket is positioned on the bridge by a plurality of dowels 78 (one only being shown in Fig. 3) that project from the bridge 74 and are disposed in guide holes 79 in the bracket 73. When the dowels are in the holes 79, the yoke 75 is swung to a horizontal position and a screw 80 is threaded through the yoke and into engagement with a projection 81 of the bracket 73. A motor 82 is mounted on a platform 83 that is adjustably secured to the bracket 73 by bolts 84. A belt 85 (Fig. 2) is trained around the pulley 70 and around a pulley 86 keyed to the motor shaft.

The knife 21 is mounted in the pulley 70 by means of a pivot member 87 that has a central flange 88 (Fig. 6) whose segmental spherical surface is disposed in pivoting engagement with the internal wall of a bore 89 in the pulley 70. A pivot rod 90 is adapted to be inserted through aligned holes 92 and 93 in the pulley 70 and through a bore 95 of the central flange 88 of the pivot member to mount the pivot member 87 for pivoting movement relative to the pulley. A setscrew 97 is arranged to be screwed into a tapped opening 98 in the flange 88 to engage a flattened portion 100 of the pivot rod 90 to lock the rod 90 to the flange.

The shank 54 of the knife 21 is secured in a bore 102 of the pivot member 87 by means of a setscrew 103. A calyx trimming blade 105 has a cutting edge 106 and a base 107 arranged to be positioned in a recess 108 in a flange 109 of the pivot member 87 and to be locked therein by a setscrew 110.

The pivot member 87 is pivoted during the coring operation by means of an inclined camming groove 112 formed in an extension member 113 that is adjustably secured on the threaded end of a push rod 114. The wall of the camming groove is arranged to receive a tubular roller 115 that is positioned in a groove 117 formed in the end of the pivot member 87. The roller 115 is held in the groove 117 by a pin 119 that is disposed in aligned openings 120 of member 87 on opposite sides of the groove 117. It will be understood that the groove 117 is wide enough to receive the end of the push rod extension 113 and that the walls of the groove 117 slidably engage the flattened walls of the end of the rod extension 113 to guide the rod and keep it aligned with the pivot member 87.

When the push rod 114 is reciprocated back and forth, the walls of the camming groove 112 (Fig. 2) move the roller 115 toward and away from the pivot axis of the pulley to effect pivoting movement of the pivot member 87. Reciprocation of the rod 114 is accomplished by a rotary cam 121 (Figs. 1 and 2) that is adjustably secured to the tubular end 122 of a shaft 123 by means of a setscrew 124 that engages a key 125 disposed in aligned keyways in the shaft and in the cam. The shaft 123 is journalled in the gear housing 28 (Fig. 1) and is driven by a gear 128 which is in mesh with a gear 129 connected to the source of power. At one end, the rod 114 is rotatably journalled in anti-friction bearings disposed in a bearing housing 132 (Fig. 2) which is secured to a hanger 135 and has a stub shaft 133 disposed in the tubular end 122 of the shaft 123. A shoulder 134 is formed on the stub shaft 133 in alignment with the tubular end 122 of shaft 123. At its upper end the hanger 135 is slidably disposed on a stationary rod 136 which projects from the gear housing 28. A cam follower roller 140 is rotatably mounted at the lower end of the hanger 135 to cooperate with a camming surface 142 of the rotary cam 121.

During one-half of the rotation of the cam 121, a forwardly inclined portion of the camming surface 142 acts on the roller 140 to cause the hanger 135 and the rod 114 to be moved in a direction away from the housing 28 against the resistance of two springs 148 and 149 which are connected between the gear housing 28 and the hanger 135. After the rod 114 has been moved forward a predetermined distance, the springs 148 and 149 return it to its rearward position as the roller 140 moves down a rearwardly inclined portion of the cam.

It is desirable that the entry hole cut in the pear by the knife be as small as possible. In Fig. 7 a position of the knife is shown wherein a leading portion 62A of the cutting edge of the wedge-shape blade 62 and the guide surface of the member 56 are disposed substantially equidistant from the axis of rotation of the knife, which is the axis of the pulley 70 and is indicated by reference numeral 150. This initial position is obtained by loosening the setscrew 124 (Fig. 2) and moving the cam 121 to the left (Fig. 2) against a collar 153. Then the hanger 135 and the bearing housing 132 are moved to the left to bring the shoulder 134 into contact with the tubular end of the shaft 123. The extension 113 of the push rod 114 is then adjusted relative to the rod 114 to position the knife 21 in the position of Fig. 7.

Since some pears have larger cores than other pears, it is desirable that the range of pivoting movement of the knife inside the pear be adjustable so that the entire core of each pear can be removed. As explained above, the amount that the knife pivots is determined by the stroke of the rod 114, which stroke is in turn determined by the effective throw of the camming surface 142. After the above-mentioned initial adjustment of the knife 21 is made, the hanger 135 is moved toward the right (Fig. 2) to cause the rod 114 to swing the knife away from its initial, minimum-hole position. When the knife has been pivoted to the position wherein the desired size of core cavity opening is described by the rotating knife, the cam 121 is moved to the right until the highest point of the camming surface 142 abuts the roller follower 140, as seen in Fig. 2. Then, during operation when the cam 121 is rotated by the shaft 123, the roller 140 will ride down the camming surface 142 until the shoulder 134 on the bearing housing 132 abuts the tubular end of the shaft 123, causing the camming surface 142 to move away from the roller 140. As previously mentioned, the position wherein the shoulder 134 abuts the shaft 123 determines the initial, minimum-hole position of the knife 21.

The operation of the coring knife 21 and its actuating and control mechanism is illustrated in Figures 7 and 8. At the beginning of a coring operation, the rod 114 is in its rearward position with the shoulder 134 abutting the shaft 123, and the knife 21 is in the generally horizontal, minimum-hole position. When power is supplied to the machine, the knife is rotated and the fruit transfer mechanism 50 grips a pear on the stemming tube. As the pear gripper members 51 of the transfer mechanism 50 move the pear off the stemming tube and into engagement with the knife, the edge of the wedge-shaped blade 62, adjacent the foremost end 60 of the knife, begins to cut into the pear and the generally cylindrical guide surface of the knife portion 56 cooperates with the blade to form a small, generally cylindrical opening 155 that has a diameter equal to twice the distance between the axis of rotation and the edge portion 62A of the blade 62. When the pear engages the butt-end trimming knife 105, a segmental conical recess is formed in the butt end of the pear.

The pear becomes fully positioned on the coring knife 21 just as the cam cylinder 32 and the pear transfer mechanism connected to the cylinder reach their rearmost or retracted position. While the transfer mechanism holds the pear in fixed position, the gear 128 (Fig. 1) is rotated, causing the rotary cam 121 to rotate. As soon as the camming surface 142 engages the roller 140, the push rod 114 is moved toward its forward position. The forward end of the push rod moves further into the bore of the pulley 70 and cams the roller 115 away from the axis of the pulley, effecting a swinging movement of the rotating knife 21 and an increase in the distance between the axis of rotation of the knife and the outermost edge of the knife. In its pivoted position, shown in Fig. 8, the knife is adapted to cut out the entire core of the pear. After a predetermined cutting period, the springs 148 and 149 return the rod 114 to its retracted position, causing the knife 21 to swing back to the initial pear-entry position of Fig. 7. Then, during the next forward movement of the cam cylinder 32, the pear gripper arms of the transfer mechanism are released by an ear 160 (Fig. 1) on the rotary cam and the pear is pushed off the knife 21 and drops into a suitable receptacle 161. As the pear is pushed off the knife, the cylindrical surface of the guide member 56 maintains a contact with the wall of the entry hole in the pear and prevents contact of the wall by the cutting edge of the blades.

Since the core of large pears is further from the butt end than the core of small pears, the distance between the flange 109 of the holder 87 and the cutting portion of the knife must be varied in accordance with the size of the pears being cored. In Fig. 6 it is seen that this adjustment can be made by loosening the setscrew 103 (Fig. 6) and moving the cutter relative to the flange 109 of the holder.

In Fig. 1 a pear P is shown impaled on a stemming tube 23 that does not project entirely through the pear. It is obvious that a stemming tube may be used which projects completely through the pear and removes all of the material along the stem axis of the pear. When a hole is made completely through the pear by the stemming tube, the knife 21 will enter this hole and may or may not increase the size of the hole depending upon the size of the cutter.

From the foregoing description it will be recognized that the present invention provides a coring mechanism that is capable of efficiently removing the core of a fruit such as a pear while the pear is in a substantially whole condition. The unique construction of the knife makes possible the cutting and breaking up of the core into fragments that may be easily separated from the cubes of fruit, and the combined rotary and pivotal movement of the knife 21 results in a complete removal of core material with a minimum of wasted material.

It will be understood that modifications and variations of the embodiment of the invention disclosed herein may be resorted to without departing from the scope of the concepts of the present invention. Therefore, the scope of the invention should be limited only by the scope and proper interpretation of the claims appended hereto.

What I claim as new and desire to protect by Letters Patent is:

1. In a fruit preparation machine, a pulley having a bore disposed on the axis of rotation of the pulley, a knife holder pivotally mounted in the bore of said pulley, a knife secured to said holder and arranged to rotate with said holder about the axis of said pulley, means for rotating said pulley, a push rod disposed in axial alignment with said pulley and having an end portion slidably positioned in the bore of said pulley, cam means operatively disposed between said knife holder and said push rod end portion whereby sliding movement of said end portion effects pivoting movement of said knife holder, a push rod support member rotatably supporting said push rod, a fixed support structure slidably mounting said push rod support member, a rotary cam having a camming surface arranged to engage said push rod support member to cause movement of said push rod in a direction to move said push rod end portion into said pulley, and means for rotating said rotary cam.

2. In a fruit preparation machine, a pulley having a bore disposed on the axis of rotation of the pulley, a knife holder pivotally mounted in the bore of said pulley, a knife secured to said holder and arranged to rotate with said holder about the axis of said pulley, means for rotating said pulley, a push rod disposed in axial alignment with said pulley and having an end portion slidably positioned in the bore of said pulley, cam means operatively disposed between said knife holder and said push rod end portion whereby sliding movement of said end portion effects pivoting movement of said life holder, a rotary cam having a camming surface arranged to engage said push rod to cause movement of said push rod in one direction to move said push rod end portion into said pulley, spring means arranged to resist the movement of said push rod by said camming surface and arranged to return said push rod in an opposite direction when said push rod passes out of contact with said camming surface, and means for rotating said rotary cam.

3. In a fruit preparation machine, a rotary drive member having a bore disposed on its axis of rotation, a knife holder disposed partially in said bore and having a transverse flange with a segmental spherical surface in contact with the wall of said bore, a transverse pin pivotally mounting said holder in said bore, means providing a slot in said holder extending longitudinally of said bore, a roller secured to said holder and spanning said slot, and a rod having an end portion disposed in sliding guided relation in said slot and having a camming surface in said end portion arranged to engage said roller and move said roller in a direction to cause pivoting movement of said holder on said transverse pin.

4. In a fruit preparation machine, a pulley having a bore disposed on the axis of rotation of the pulley, a knife holder pivotally mounted in the bore of said pulley, a knife secured to said holder and arranged to rotate with said holder about the axis of said pulley, means for rotating said pulley, a push rod disposed in axial alignment with said pulley and having an end portion slidably positioned in the bore of said pulley, cam means operatively disposed between said knife holder and said push rod end portion whereby sliding movement of said end portion effects pivoting movement of said knife holder, a push rod support member rotatably supporting said push rod, a fixed support structure slidably mounting said push rod support member, a rotary cam having a camming surface arranged to engage said push rod support member to cause movement of said push rod in a direction to move said push rod end portion into said pulley, means for rotating said rotary cam, said fixed support structure having an opening in alignment with said push rod, and a stub shaft on said push rod support member slidably disposed in said opening.

References Cited in the file of this patent

UNITED STATES PATENTS

| | | |
|---|---|---|
| 1,650,694 | Coons | Nov. 29, 1927 |
| 1,671,587 | Johnson | May 29, 1928 |
| 1,861,084 | Goranson et al. | May 31, 1932 |
| 2,075,750 | Pease | Mar. 30, 1937 |
| 2,139,704 | Thompson et al. | Dec. 13, 1938 |
| 2,282,326 | Ewald | May 12, 1942 |
| 2,614,595 | De Back et al. | Oct. 21, 1952 |